United States Patent [19]

Kohno et al.

[11] Patent Number: 4,880,707
[45] Date of Patent: Nov. 14, 1989

[54] STICK OF COMPOSITE MATERIALS AND PROCESS FOR PREPARATION THEREOF

[75] Inventors: Yuichiro Kohno; Akio Hara, both of Itami, Japan

[73] Assignee: Sumitomo Electric Industries Ltd., Osaka, Japan

[21] Appl. No.: 231,644

[22] Filed: Aug. 10, 1988

Related U.S. Application Data

[63] Continuation of Ser. No. 110,022, Oct. 15, 1987, abandoned, which is a continuation of Ser. No. 743,387, Jun. 11, 1985, abandoned.

[30] Foreign Application Priority Data

| Jun. 12, 1984 [JP] | Japan | 59-120218 |
| Jun. 12, 1984 [JP] | Japan | 59-120219 |
| Aug. 2, 1984 [JP] | Japan | 59-163095 |
| Mar. 13, 1985 [JP] | Japan | 60-49559 |

[51] Int. Cl.$^4$ .............................. C22C 29/16
[52] U.S. Cl. .......................... 428/565; 419/8; 428/552
[58] Field of Search ............... 428/551, 552, 565; 419/8

[56] References Cited

U.S. PATENT DOCUMENTS

| 3,362,802 | 1/1968 | Ellis | 428/564 |
| 4,235,583 | 11/1980 | Reed | 425/464 |
| 4,293,618 | 10/1981 | Hara et al. | 428/551 |
| 4,334,928 | 6/1982 | Hara et al. | 75/238 |
| 4,374,900 | 2/1983 | Hara et al. | 428/551 |
| 4,403,015 | 9/1983 | Nakai et al. | 428/565 |
| 4,686,080 | 8/1987 | Hara et al. | 419/8 |

FOREIGN PATENT DOCUMENTS 0157625 10/1985 European Pat. Off. .

Primary Examiner—Stephen J. Lechert, Jr.
Assistant Examiner—Eric Jorgensen
Attorney, Agent, or Firm—Kerkam, Stowell, Kondracki & Clarke

[57] ABSTRACT

A stick of composite materials comprises a hot-pressed super-hard head member containing higher than 50 vol % of a diamond powder and/or a high pressure boron nitride powder, and a supporting member which is bonded at one of its ends with the hot-pressed super-hard head member. The stick of composite materials is characterized in that:

the bonding between the head member and the supporting member is formed during the hot press process of the head member;

the stick is of an elongated form, preferably of a cylindrical form of which the sectional diameter or equivalent sectional diameter is not larger than 3 mm;

the length of the head member is 0.3 to 2.0 mm in the axial direction of the stick; and that the supporting member is more than five times longer in its axial direction than the head member.

The stick of composite materials is usable as a blank for the microdrill, micropunch and the head of the dot character printer.

The stick of composite materials is prepared by hot-pressing two layers of materials under a high pressure and at a high temperature to obtain a composite material block composed of a super-hard layer and a supporting layer bonded to the super-hard layer and cutting the same in its axial direction by means of electron spark, electron beam, laser beam or ion beam cutting method into at least two elongated pieces each having a diameter not larger than 3 mm.

21 Claims, 4 Drawing Sheets

STICK OF COMPOSITE MATERIALS AND PROCESS FOR PREPARATION THEREOF

This is a continuation of Ser. No. 110,022, filed 10/15/87, now abandoned, which is a continuation of 743,387, filed 6/11/85, also abandoned.

FIELD OF THE INVENTION

The present invention relates to a stick of composite materials having a super-hard head member, preferably in the cylindrical form, and the process for preparation of the same.

More particularly, the present invention relates to a stick of composite materials comprising a super-hard head member of a hot-pressed diamond or a hot-pressed high pressure boron nitride, and a supporting member integrally bonded to the head member and made of, for example, a hard sintered alloy.

The stick of composite materials according to the present invention is usable as a blank for the high performance mirco drill and mircopunch or a head member of the dot character printer.

DESCRIPTION OF THE PRIOR ARTS

There have been widely used drills of a hard sintered alloy for machining holes in metallic or non-metallic materials. particularly, for machining holes in the circuit boards for which demand acutely increases in these years, the microdrills of hard sintered alloy having a diameter around 1 mm were used. As the circuit boards of higher integration density will be further required, microdrills of higher performance will be demanded.

Among the various kinds of circuit boards, the so-called "glass-epoxy circuit boards", which are produced by impregnating glass fibers with epoxy resin, are mainly used.

Machining of holes in such glass-epoxy circuit boards is conducted by rotating drills at a high speed such as 50,000 to 60,000 rpm. Thus the glass fibers abrades rapidly the tools of hard sintered alloy, of which the duration of life is generally 3,000 to 5,000 hits (the term "hit" indicates the number of times of the hole machining operations.). The drilling machine for circuit boards is usually equiped with an automatic device for exchanging the worn tool with a new one. As the integration density of the circuit board becomes higher as mentioned above, the time period required for the exchange of the tools is to be shorter and then it is required to prolong the duration of life of the tool to thereby decrease the times of exchange of the tools, that is, the total time period for such exchanges.

In view of the rapid development of the electronic devices, there is a strong demand for obtaining a high performance circuit board by improving the physical properties such as the heat resistance. Although such a high performance circuit board is producible as it is, the machinability thereof is generally low. Since the drills of hard sintered alloy readily wear out in machining such high performance circuit boards, such high performance circuit boards have not been put into practical use.

Further there is a demand for heightening the production efficiency by increasing the rotating speed of the tool in machining usual glass-epoxy circuit boards. However, the duration of life of the usual tools of hard sintered alloy become abruptly shorter as the machining is conducted at higher totating speed, so that a high productivity cannot be attained by increasing the machining speed.

There has been developed and employed tools of hot-pressed diamond compact, which exhibit an excellent hardness and wearing resistance as compared with the tool of hard sintered alloy and exhibits a very high performance in machining the above mentioned reinforced resin circuit boards.

Figure 1:
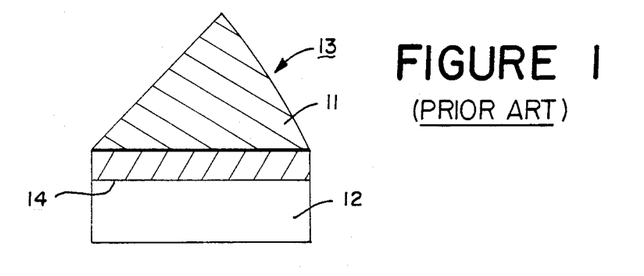
FIG. 1 a persepective view of a hot-pressed diamond composite compact of the prior art.

As shown in FIG. 1, the diamond tool is equipped with a tip 13 of composite materials which contains a layer 11 of hot-pressed diamond compact bonded to a supporting member 12 of hard sintered alloy.

Figure 2:
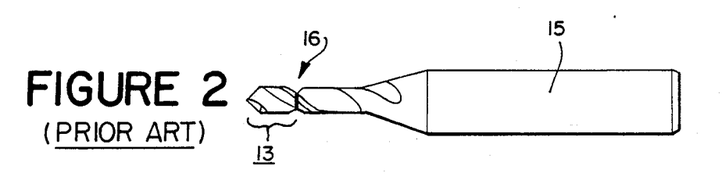
FIG. 2 is a perspective view of a drill containing the hot pressed diamond compact composite material at it top end portion.

In case a drill is manufactured from the tip 13 of composite materials, the tip 13 must be connected by any means to the top end of a shank 15 as shown in FIG. 2. However, the top end of the drilling tool is generally smaller in diameter than 1 mm, and in some cases, smaller than 0.5 mm. If the tip 13 is not very rigidly bonded to the shank 15 of a small diameter, the tip 13 tends to be easily removed at the bonded portion 16 from the shank 15 during the working of the tip 13 into drill. Particularly, the hot-pressed diamond compact exhibits a high resistance to working. Then, the bonding strength obtained by silver brazing is insufficient for maintaining the tip to the shank in such working. Thus it has been difficult to manufacture a high performance drill therefrom.

There is an electron beam welding as a means for providing a high strength bonding. But as the electron beam welding is very complicated and expensive to conduct, it has not been able to satisfy the increasing demand for high performance drills.

A rigid bonding has not been obtained also by hot pressing the head member together with the supporting member. The blank for the microdrill must be of a small section and elongated form. It was practically impossible to hot press such an elongated member by the prior art technique.

Namely, if a compact of powder material in a form of a long stick is hot pressed by pressing the same in its axial direction, a rigid hot-pressed compact cannot be obtained since the powder material is not pressed sufficiently at the mid portion in the axial direction due to a considerable pressure loss by the thick layer of the powder material. Further, if the pressing pressure is enhanced in the axial direction of the stick, the pressure becomes distributed so irregularly in the hot-press container that the stick tends to be buckled or curved. Thus, a hot-pressed compact cannot be obtained with precision.

In view of the above mentioned problem, in the case of the hot press of an elongated piece, it can be conceived that the compact material is charged in the container in such a disposition that the axial direction of the piece is perpendicular to the pressing direction. If an elongated composite compact in which two layers of materials are arranged in their axial direction is hot pressed in such a disposition, a sufficient bonding strength cannot be obtained between these layers since the pressure is not sufficiently exerted at the interface of these layers in the direction perpendicular thereto.

As to the supporting member or base member of the composite stick, it must be of a high strength, particularly in the case of a microdrill. As mentioned above, the integration density of the circuit board has become higher in these years, and this tendency will be enhanced. That is, the diameter of the machined hole in the circuit board will become smaller. Thus, microdrills of which the diameter is, for example, 0.1 mm or 0.3 mm will be demanded. Then, it should be noted that as the microdrill becomes smaller in diameter, it tends to be broken or bent easier. If the drill is bent before the duration of life of the diamond member, it is meaningless to use the expensive diamond.

To the contrary, if the supporting member is made of a soft or low rigidity material, it tends easily to be buckled so that a straight hole cannot be machined. Moreover, the supporting member of a soft material would wear out easily due to the abrasion by cuttings.

SUMMARY OF THE INVENTION

The object of the present invention is to resolve the above explained problems of the prior art, and more particularly it is a main of object of the present invention to provide a stick of composite materials having a super hard hot-pressed head member bonded rigidly to the supporting member, and the process for preparation of the same.

Another object of the present invention is to produce, readily and at low cost, microdrills having an excellent wearing resistance and a high rigidity.

A further object of the present invention is to provide at low cost a high performance microdrill of a long duration of life, which is suitably employed in machining circuit boards of low machinability such as the glass-epoxy circuit board.

A still further object of the present invention is to provide an elongated stick of composite materials and the process for preparation thereof, which is suitably usable as a punch or head member of the dot character printer.

BRIEF DESCRIPTION OF THE ACCOMPANYING DRAWINGS

FIGS. 3 (a) to (d) each shows the embodiments of the stick of composite materials according to the present invention;

FIG. 4 (a) shows diagramatically how a microdrill is prepared from the cylindrical stick of the present invention, and FIG. 4 (b) shows the thus obtained microdrill;

FIG. 5 (a) shows diagramatically how a punch is prepared from the stick of the present invention which has a square section, and FIG. 5 (b) shows the thus obtained punch;

FIG. 6 (a) is a perspective view of an example of the composite material block prepared according to the present invention, and FIG. 6 (b) shows another example of the composite material block which has an interlayer;

FIG. 8 (a) is a perspective view of an electrode means comprising three pipe electrodes for cutting three sticks from the composite material block simultaneously, and FIG. 8 (b) is a detailed view of the pipe electrode shown in FIG. 8 (a); and FIG. 9 (a) is a side view of an electrode means comprising a plurality of pipe electrodes, and FIG. 9 (b) is a plan view of the same electrode means showing the positions of the electrodes with respect to the composite material block.

DESCRIPTION OF THE PREFERRED EMBODIMENTS OF THE INVENTION

The present inventors have succeeded in obtaining a stick of composite materials having a super-hard head member by hot pressing a composite compact of a large section with respect to its axial length and cutting the thus hot-pressed composite material block into a plurality of pieces in the form of an elongated stick by means of the electron spark, electron beam, laser beam, ion beam cutting methods, etc.

First, the characteristics of the shape and the size of the stick of composite materials according to the present invention will be explained with reference to FIGS. 3 (a) to (d).

Figure 3A:
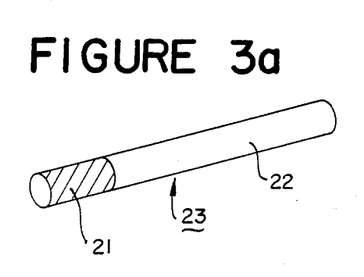
Figure 3B:
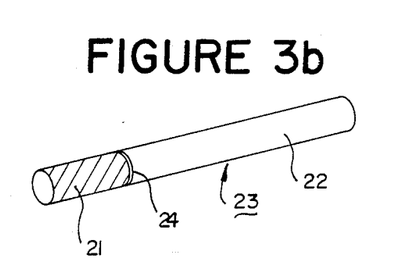
Figures 3C, 3D:
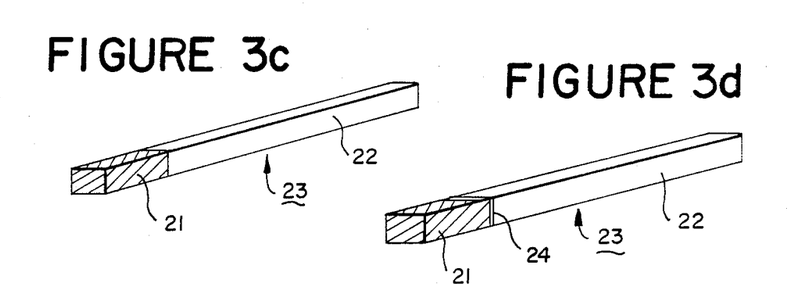

FIGS. 3 (a) to (d) illustrate respectively an embodiment of the stick of composite materials according to the present invention.

The stick 23 of composite materials shown in FIG. 3 (a) is generally of a cylindrical form and comprises a super-hard hot-pressed head member 21 and a supporting member 22 bonded at one end thereof to the head member 21.

On the other hand, in the stick 23 shown in FIG. 3 (b), the head member 21 is bonded to one end of the supporting member 22 through an interlayer 24.

The sticks 23 shown in FIGS. 3 (c) and (d) have a square section. In the stick shown in FIG. 3 (c), the head member 21 is directly bonded to the supporting member 22, while, in FIG. 3 (d), the head member is bonded through an interlayer 24 to the supporting member 22.

However, the sectional shape of the stick of composite materials according to the present invention is not restricted only to circular or square form, and it may be of any other sectional form.

According to the present invention, the sectional diameter or the sectional equivalent diameter of the stick of composite materials must not be larger than 3 mm. A stick of composite materials having a diameter or an equivalent diameter larger than 3 mm is not appropriate as a blank of the microdrill. If such a stick of a large diameter is used as a blank of the microdrill, the chipping margin which is to be removed in forming cutting edges becomes uneconomically large. Moreover, a composite material compact large than 3 mm in diameter can be prepared by other process than the present invention.

The super-hard hot-pressed head member of the stick must be of 0.3 to 2 mm in length according to the present invention. With a head member shorter than 0.3 mm in length, it is not possible to improve substantially the cutting performance of the drill. On the other hand, the use of a stick having a super-hard head member longer than 2 mm consumes a relatively large amount of an expensive material such as a diamond powder and thus it is uneconomical.

Further, the supporting member 22 must be more than five times longer in the axial direction of the stick than the head member 21, because the supporting member 22 is to be inserted in a hole disposed at the top end of the shank of a drill and a sufficiently long cutting edges is to be worked on its circumferential surface.

Next, the use of the stick of composite materials according to the present invention will be explained with reference to FIGS. 4 and 5.

Figure 4A:
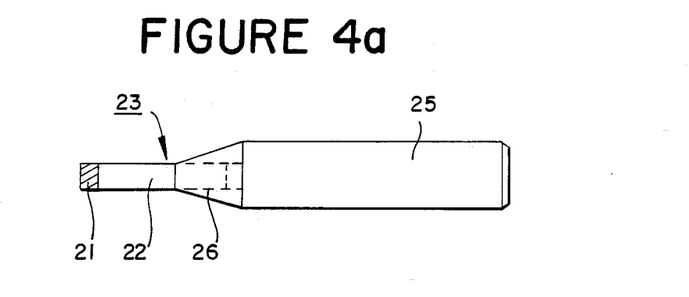
Figure 4B:
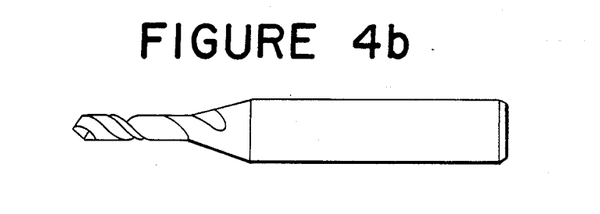

As shown in FIG. 4 (a), a shank 25 for the drill is drilled at its top end to define a hole 26 having a substantially same diameter as the cylindrical stick 23. The cylindrical stick 23 is fitted into the hole 26 at its end portion and fixed therein. For fixing the stick 23 in the hole 26, a brazing material is poured in the hole 26 beforehand and then the end of the stick 23 is brazed to the shank 25. Then, the circumferential surface of the stick 23 is ground to remove the surface layer in a depth of about 0.1 mm and the grooves and the cutting edges are formed to provide a microdrill as shown in FIG. 4 (b).

Figure 5A:
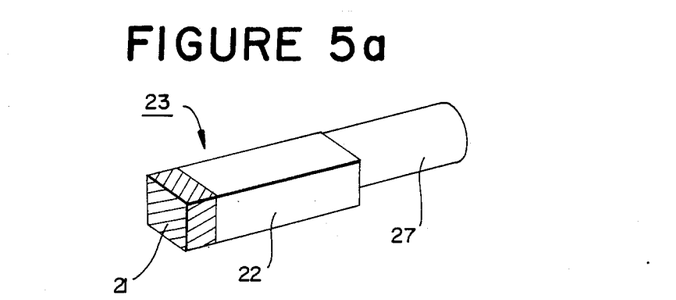
Figure 5B:
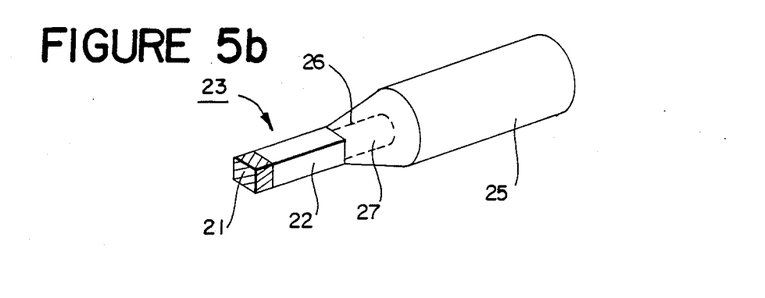

FIGS. 5 (a) and (b) illustrate an example of use of the square stick of the present invention.

The end portion remote from the head member 21 of the suppporting member 22 is worked by grinding into a cylindrical form 27 over a certain length as shown in FIG. 5 (a). The thus formed cylindrical end portion of the supporting member 22 is fitted into a hole 26 disposed at the top end of the shank 25, and brazed thereat. Then, the circumferential surface of the square stick 23 is subjected to a finish working to a predetermined shape to provide a square punch as shown in FIG. 5 (b).

The cylindrical stick of composite materials according to the present invention does not require the complicated electron beam welding and has a strong and rigid integrated structure. Thus, it is possible to machine holes at high efficiency in a high performance circuit board such as a glass-epoxy circuit board.

Further, it is easy to fit the end portion of the cylindrical stick of composite materials of the present invention into a hole of the shank. Such an attachment does not require any special working of the cylindrical stick. Moreover, forming of the cutting edges is also easy and the amount of cuttings generated in such a working is small.

According to the present invention, there is further provided a process for preparing a stick of composite materials comprising a hot-pressed super-hard head member containing higher than 50 vol % of a diamond powder and/or a high pressure boron nitride powder, and a supporting member being bonded at one of its ends with said hot-pressed superhard head member, said process comprising the steps of:

charging a hot press container with two layers of materials by piling them adjacent to each other in the pressing direction, one of said layers being for preparing the hot-pressed super-hard head member and, the other layer being for preparing said supporting member which is to be bonded with the first-mentioned layer during the hot-pressing;

hot pressing said layers of materials under a high pressure and at a high temperature to sinter the first-mentioned layer, to thereby provide a composite material block having a hot-pressed super-hard layer of which thickness is not larger than 1/6 of that of the composite material block;

cutting the composite material block in its axial direction by means of one method selected from the group consisting of electron spark, electron beam, laser beam and ion beam cutting methods into at least two sticks of composite materials each having a diameter not larger than 3 mm. The composite material block may be of any sectional shape. But, the length in the axial direction, that is, in the pressing direction, must not be larger than three times, preferably two times of the equivalent diameter thereof. If the axial length is longer than three times of the equivalent diameter of the section perpendicular to the axis, the pressure exerted to the block during the hot press tends to distribute irregularly to thereby cause the buckling or curving of the block. In this specification, the "equivalent diameter" of a section denotes the diameter of a circle of which surface is equal to the section in problem. The diamond powder and/or high pressure boron nitride powder have preferably a mean particle size not greater than 30 $\mu$m to endow a high wearing resistance and a high rigidity to the resulting stick of composite materials.

However, with a diamond powder and/or high pressure boron nitride powder having a mean particle size larger than 10 m, the cutting tool, drill and punch are not finish worked so sharply that a high performance is not attained. Thus, it is further preferable to use a diamond powder and/or high pressure boron nitride of a mean particle size not greater than 10 m.

The layer containing a diamond powder includes, for example, only a diamond powder, or a mixture containing more than 70 vol % of a diamond powder and the balance being a binder powder of which predominant constituent is Fe, Co or Ni. As a preferred example of such a mixture for the first layer, there is a mixture containing not lower than 70 vol % of a diamond powder and a powder of WC- 5 to 15 vol % Co.

When the first layer for the head member contains only a diamond powder, the binding material contained in the second layer permeates in the first layer during the hot pressing of the first layer, whereby attaining the sintering of the first layer.

The first layer, which contains a high pressure boron nitride, may contain only the boron nitride powder or may contain not lower than 50 vol % of a high pressure boron nitride and, as a binder, a carbide, nitride and carbonitride of the Group IVa, Va, VIa elements of the Periodic Table, and Al and/or Si. Here, the high pressure boron nitride includes the boron nitrides of wurtzite structure and cubic structure.

The high pressure boron nitride powder can be hot pressed without binder to a hard compact body.

The second layer for preparing the supporting member may be a so-called hard sintered alloy, a cerment or powder material therefor. The hard sintered alloy contains at least one member selected from the group consisting of carbides, nitrides, carbonitrides, borides, silicates and mutual solid solutions thereof of the Group IVa, Va and VIa elements of the Periodic Table, and a tinder of iron metal such as Fe, Co and Ni. A cermet includes (Mo, W) C binded with an iron metal such as Ni or Co.

As another type of the second layer, there is the so-called "heavy metal" or its powder material, which contains 80 to 98 wt % of W and the balance being Ni-Fe or Ni-Fe-Cu.

As explained in the above, the second layer may be a sintered alloy or it powder material. In view of the convenience in handling the same and of the fact that a high pressure is easily applied during the hot press process, it is preferable to use a sintered alloy in the form of a solid block.

According to a preferred embodiment of the invention, a hard sintered alloy containing WC as the predominant constituent is used as the second layer. Such a hard sintered alloy presents a high rigidity together with an excellent wearing resistance while maintaining a high strength.

TiC and TaC, which are usually contained in the hard sintered alloy for use as a tool for cutting steel materials, are not effective to improve the wearing resistance and tend to rather lower the strength of the alloy. But, the hard sintered alloy contains as low as several percentage of TaC, $Cr_3C_2$ and VC, which are effective for restraining the grain growth of WC or for refining the grains of the alloy. Further, as a binder, Co and Ni are preferably used, and Co is the most preferable binder.

The present inventors further conducted experiments and examination in order to improve the bending strength and the wearing resistance of the support member.

As mentioned in the above, the length of the supporting member must be more than five times larger than that of the head member. Thus, there is a reasonable possibility that the stick would be bent or buckled at the supporting member. The severe abrasion of the supporting member due to a high rotation of the drill must be also taken into account.

In order to resolve these problems, it should be firstly noted that one of the characteristics of the present invention resides in that the bonding between the head member and the supporting member is made during the hot press process of the head member. Then, the supporting member undergoes a high temperature and an ultra high pressure where the diamond or high pressure boron nitride is stable. That is, a sintering of WC-Co is conducted under vacuum at a temperature of 1300° to 1500° C., while the hot press of the diamond or high pressure boron nitride is conducted around the same temperature range but under an ultra high pressure of 40,000 to 50,000 atm. Accordingly, the ultra high pressure affects the mechanical properties of WC-Co, regardless of whether the second layer is in the sintered form or powdered form.

Since it is easy and convenient to use the second layer in the form of the sintered solid block, the present inventors have conducted various experiments by hot pressing WC-Co sintered alloy under the above condition, and found the following phenomena.

Generally, the mechanical properties of WC-Co sintered alloy depend upon the content of Co and the particle size of WC crystals. But, if WC crystals having a particle size larger than 3 $\mu$m are exposed to a high temperature and an ultra high pressure, the WC crystals are broken to vary the mechanical properties drastically. Thus, the mean particle size of WC in the sintered alloy used as the second layer should be smaller than 3 $\mu$m.

However, according to the experiments of the present inventors, the mechanical properties of WC-Co alloy are not always degraded after the exposition thereof to the hot pressing condition of the diamond or the high pressure boron nitride. This is due to the fact that, since WC crystals have a high wettability with the liquid Co under the hot press condition, the liquid Co permeates into the broken WC crystals to thereby bond the same solidly.

According to the technical knowledge of the prior art, if the WC-Co alloy having a mean particle size smaller than 1 $\mu$m is contaminated with a small amount of large particles of WC crystals, such large particles tend to develop a fracture therefrom. Thus such large WC particles were believed to lower the strength of the alloy. In the experiments of the present inventors, however, there were found some examples where the strength is heightened even after undergoing the hot press. Such increase in the strength depends upon the content of the binder metal in the sintered alloy. The present inventors consider that the increase in the strength is due to the phenomenon that the binder metal permeates into the large broken WC particles and bond the same solidly.

On the other hand, there would not raise any problem if the pressing of the ultra high pressure is effected in a perfectly hydrostatic manner. But, such a perfect condition is scarcely attained in the practical production while efforts are made to approach the production to it. Thus, the hard sintered alloy undergoes some irregular deformation during the hot press process. In the case of WC-Co alloy containing a sufficient amount of Co, the deformation of the crystal structure may be compensated by the permeation of Co to the deformed sites. But, in WC-Co alloy of a low Co content, the portion which is deformed most severely would cause defects such as fine fissures or holes.

After determining the bending strength of WC-Co alloy by varying the Co content, the present inventors found that with a Co content lower than 7 wt %, the bending strength lowers after the hot press of the high temperature and ultra high pressure, while the bending strength increases when the alloy contains more than 12 wt % of Co.

It is considered that, in the case of the Co content lower than 7 wt %, the broken WC crystals are not permeated with Co and causes the defects as explained in the above. On the other hand, in the case of the Co content higher than 12 wt %, the bending strength is heightened due to the following phenomenon:

First, it is believed that the fracture of WC-Co alloy develops from the coarse WC crystals, holes or vacancies, and abnormal phases. In the experiments, it has been confirmed by microscopic observation before the hot pressing that there did not exist abnormal phase in the alloy. The coarse WC crystals affects the strength as explained in the above.

The "holes" designates the holes ranging from several to several hundred $\mu$m. From the experience in the HIP process, it is supposed that such holes collapse due to the ultra high pressure or are filled with Co. Since the hot press is conducted at about the same temperature as the HIP but under a pressure higher by ten times than the HIP, such a phenomenon would be further intensified in the hot press according to the present invention.

In the WC-Co alloy of 20 wt % Co, the bending strength was increased by 30 % after the hot press. The reason for this increase in the strength will be further examined in more detail.

The Co phase in the WC-Co alloy is of FCC structure and is composed of almost pure Co, while it contains around 10 wt % of W when the C content is low. Then, in general, the WC-Co alloy of a high Co content is easily deformed. The strain-stress curve of such a high Co content WC-Co alloy is of low gradient, which means a low bending strength.

After an examination of the Co phase of the alloy which has been subjected to the hot press, it was found that the Co phase contains about 15 wt % of W and becomes hard to deform. Such an increase in the W content in the Co phase will be analysed as follows:

First, the Co phase deposited at the eutectic temperature from the ternary eutectic crystal of Co-W-C contains about 20 wt % of W. During the cooling step after the usual sintering, W is deposited in the W phase from the ternary eutectic Co-W-C. But, in the hot press of the process according to the present invention, when the hot press is completed, the electric supply for heating means is cut off to cool the hot-pressed compact and then the pressing pressure is loosed. It means that when the compact is cooled to the eutectic temperature at which W would deposit in the WC phase, the compact is still subjected to an ultra high pressure. Under such an ultra high pressure, the diffusion velocity of W is lowered in the solid phase and thus the deposition of W to the WC phase is prevented. Such assumption is confirmed by the fact that much of W is present in the state of solution in the Co phase of the WC-Co alloy of the support member of the stick of the present invention. Accordingly, the WC-Co alloy containing a high amount of Co which is considered to be too deformable under the usual condition exhibits a higher bending strength after the hot press of high temperature and ultra high pressure.

Then, according to a preferred embodiment of the present invention, the supporting member is composed of a hard sintered alloy of which the mean particle size of the carbide is smaller than 2 μm and which contains more than 12 wt % of a binder metal.

One of the important characteristis of the stick of composite materials according to the present invention resides in that the bonding between the hot-pressed super-hard head member and the supporting member is made during the hot press of the head member. Accordingly, it is necessary to select the materials of the first and second layers so that these layers are bonded to each other by the hot press of the first layer. The bonding of the layers is easily attained because the binding agent of the iron group metal permeates from the second layer to the first layer at the high temperature and under the ultra high pressure. Thus, it is easy for those skilled in the art to determine the chemical compositions of the first and second layers in the above described ranges so as to bringing out the bonding of these layers.

Further, the powder of high pressure boron nitride can be sintered without any binding agent, and then it can be bonded to the support member during the sintering thereof.

According to an embodiment of the present invention, an interlayer having a thickness less than 0.5 mm is disposed between the first and second layers and these layers are hot deformable under the usual condition exhibits a higher pressed together.

A preferable interlayer contains less than 70 vol % of high pressure boron nitride and the balance composed mainly of at least one selected from the group consisting of carbides, nitrides, carbonitrides and borides of the Group IVa element such as Ti, Zr and Hf and their mutual solid solutions, and more than 0.1 wt % of Al and/or Si.

According to a preferred embodiment, the second layer for the support member comprises at least two layers of materials arranged adjacent to each other in the axial direction thereof. The second layer may be composed of, for example, a layer of WC-Co at the side remote from the head member, and a layer of a cermet of (Mo, W) C bonded by Ni or Co at the adjacent side to the head member.

Further, two layers of materials each intended for the head member are arranged respectively as the first layer at the upper and lower sides of the second layer and are hot pressed to provide a composite block which contains the first layers at the both sides. The composite block is then cut into at least two sticks each having the super-hard head members at the both ends.

Now, the cutting method of the composite sticks from the composite material block will be explained with reference to the drawings.

Figure 6A:
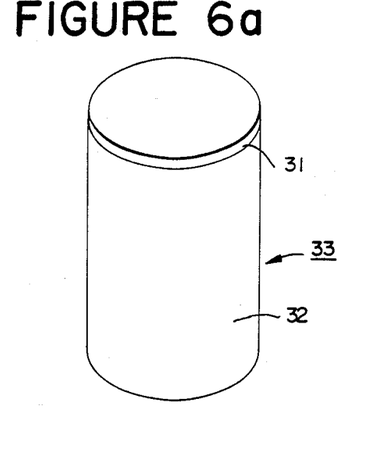
Figure 6B:
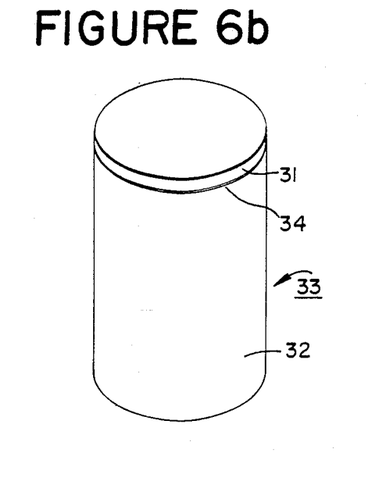

There are two types of the composite material block. In one type, the composite material block 33 comprises a thin layer 31 of hot-pressed diamond compact and a supporting layer 32 of hard sintered alloy bonded to the thin layer 31 at the top surface thereof as shown in FIG. 6 (a). In the other type, the layer 31 is bonded to the supporting layer 32 through an interlayer 34 as shown in FIG. 6 (b). Although the composite material blocks shown in FIGS. 6 (a) and (b) are of the cylindrical form, it may be of any other form such as a square timber.

Figure 7:
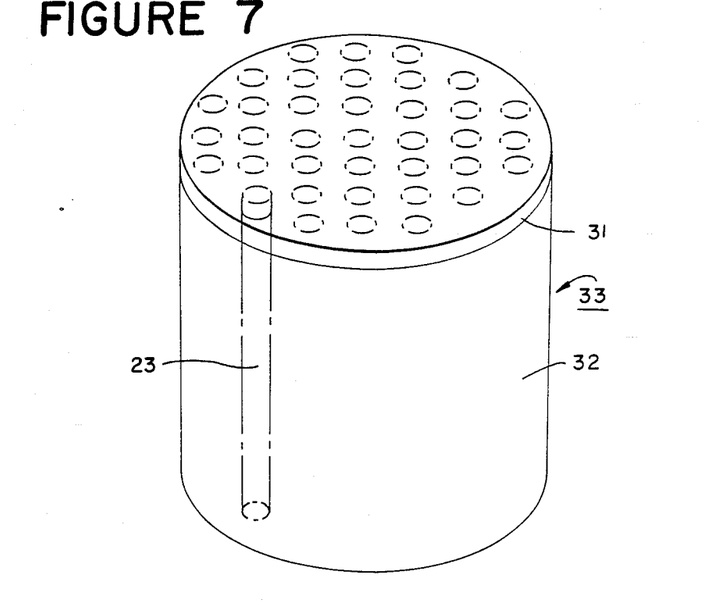
FIG. 7 shows the position at which a stick of composite materials is to be cut out from the composite material block according to the present invention.

As shown in FIG. 7, the composite material block 33 is cut in its axial direction into a plurality of sticks each having a diameter or an equivalent diameter not greater than 3 mm by means of, for example, the electron spark cutting method employing wire or pipe electrode, or by a beam of a high convergency and a high energy such as electron beam, laser beam and iron beam.

In the electron spark wire cutting method, high electric pressure is applied between a tension wire and the composite material block, and the block is cut off by the running tension wire. This method is described in detail in U.S. Pat. No. 3,103,137 and thus it will not explained here.

In the electron spark cutting method employing the pipe electrodes, high electric pressure is applied between the electrodes and the portions of the composite material block to be cut off, while these are separated at a certain distance, or these are dipped in an insulating liquid.

Figures 8A, 8B:
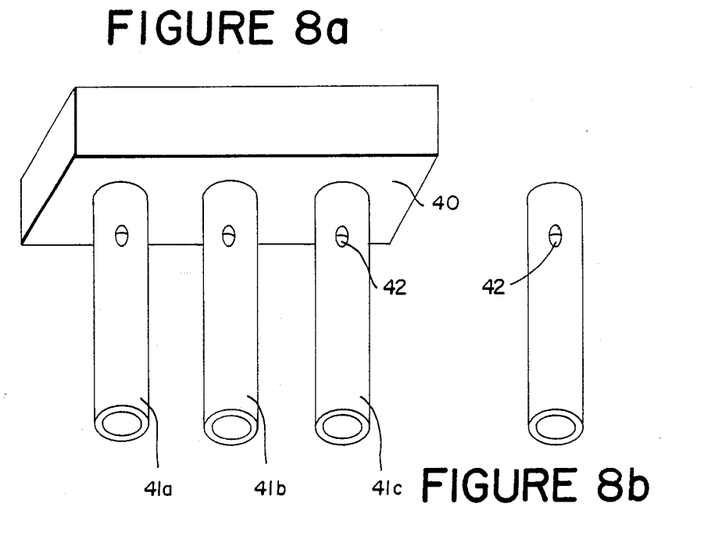
Figure 9A:
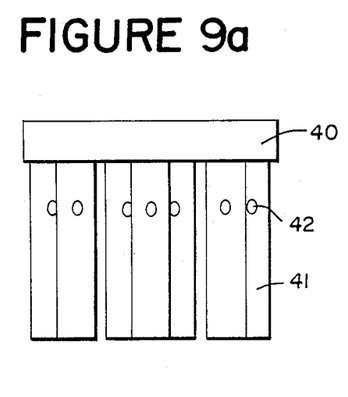
Figure 9B:
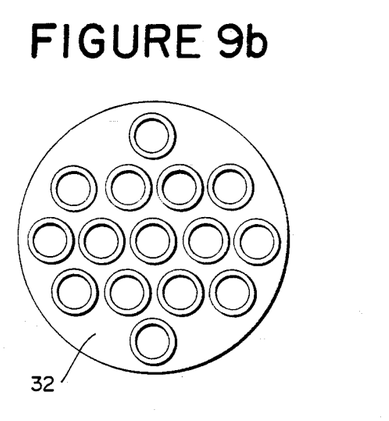

FIGS. 8 (a) and (b) show an example of a electrode means which is employed in the process of the present invention. The electrode means comprises a support plate 40 and three pipe electrodes 41a, 41b and 41c attached perpendicularly to the support plate 40 so as to cut off three composite sticks simultaneously. The pipe electrode 41 is, as shown in FIG. 3 (a), of a hollow cylindrical form and is disposed with a hole 42 for liberating the gasified material which is generated at the time of cutting FIG. 9 (a) shows another type of the electrode means which comprises a plurality of pipe electrodes 41. FIG. 9 (b) shows the disposition of the pipe electrodes 41 with respect to the upper surface of the composite material block.

The electrode means which may be employed in the process according to the present invention is not restricted to the types described in the above, and it may be of any other type with which the composite block can be cut off into a plurality of sticks, such as an electrode of a honeycomb form.

Since the electron spark cutting method is by itself well-known in the art and is not the direct subject matter of the present invention, it will not be explained here any more.

The composite material block can be cut into stick members of any sectional configuration by means of a beam of a high convergency and a high energy such as electron beam, laser beam and ion beam. These high energy beam cutting methods are also well-known by itself in the art and are not the direct subject matter of the present invention, these will not be explained in more detail here.

The stick of composite materials of the present invention has been explained and defined by the chemical composition thereof before the hot press, but it is not explained as hot-pressed. However, the chemical composition and microscopic structure of the components of the composite stick, that is, of the head member, supporting member and interlayer, vary delicately depending upon the temperature, pressing pressure and time duration of the hot press. Thus, the present invention will be more clearly and definitely understood if it is defined in terms of the chemical composition of the starting materials.

The present invention will be explained by way of examples which illustrate the preferred examples of the present invention but are not to be construed to restrict the scope of the invention.

By the way, the percentage indicates percentage by volume in this specification unless otherwise indicated

EXAMPLE 1

The followings were prepared:

A ring of WC-12% Co sintered alloy of 18 mm in outer diameter, 14 mm in inner diameter and 15 mm in height;

a cylinder block of WC-12% Co sintered alloy of 14 mm in outer diameter and 12 mm in height;

a circular disc of WC-12% Co sintered alloy of 14 mm in outer diameter and 0.5 mm in thickness; and a mixture of diamond powder containing 85% of diamond powder having a particle size of 0.5 μm and the balance being WC-15% Co powder having a particle size smaller than 0.5 μm.

The cylinder block was inserted in the ring to define therein a hollow space of 14 mm in diameter and 3 mm in depth in which the mixture of diamond powder was then charged and pressed to form a layer of 1.5 mm in thickness, and the upper portion of the hollow space was closed with the circular disc to form a container. The thus prepared container was charged in a hot press machine and the hot press was conducted at 1370° C., under a pressure of 55 kb and for 15 minutes After cooling the container and loosing the pressing pressure, the circur disc was removed by grinding to obtain a composite block composed of a supporting layer of 12 mm in height, a hot pressed diamond layer of 1 mm in thickness bonded to the upper surface of the supporting layer and a ring of sintered alloy surrounding the circumference of the head layer and the supporting layer.

The composite material block was subjected to the electron spark wire cutting method as shown in FIG. 7 to obtain cylindrical sticks of composite materials of 1 mm in diameter and 13 mm in length each of which contains a hot-pressed diamond head member of 1 mm in length bonded at the top end of the supporting member of WC-12% Co.

The above composite block was also cut by the electron spark method employing a electrode means shown in FIG. 9 (a) to obtain sticks of composite materials of the same configuration as the above mentioned composite sticks One of the above composite stick was fitted in a hole of a steel shank as shown in FIG. 4 (a) and brazed thereto. The outer surface of the stick was then removed by grinding in a depth of 0.1 mm and worked to form grooves and blades edges.

With the thus obtained micro drill, it was possible to conduct hole machining of more than 200,000 shots in glass-epoxy circuit boards.

EXAMPLE 2

The followings were prepared:

A ring of WC-12% Co sintered alloy of 18 mm in outer diameter, 14 mm in inner diameter and 20 mm in height;

a cylinder block of WC-12% Co sintered alloy of 14 mm in outer diameter and 18 mm in height;

a circular disc of WC-12% Co sintered alloy of 14 mm in outer diameter and 0.5 mm in thickness;

a mixture of diamond powder containing 90% of diamond powder having a particle size of 3 μm and the balance being Co powder; and another mixture of boron nitride powder containing 60% of high pressure boron nitride (which will be abbreviated as "CBN" hereinafter) having a particle size of 3 μm and the balance being a powder of TiN-10 wt % Al.

A solution of the mixture of CBN powder was applied with a thickness of 50 μm on the top surface of the cylinder block and heated to remove the solvent.

The cylinder block was then inserted in the ring to define therein a hollow space in which the mixture of diamond powder was charged and pressed to form a layer of 1.8 mm in thickness, and the upper portion of the hollow space was closed with the circular disc to form a container. The thus prepared container was charged in a hot press machine and the hot press was conducted at 1400° C., under a pressure of 55 kb and for 10 minutes.

After cooling the container and loosing the pressing pressure, the circur disc was removed by grinding to obtain a composite block composed of a supporting layer of 18 mm in height, a hot pressed diamond layer of 1.2 mm in thickness bonded to the upper surface of the supporting layer through an interlayer of hot pressed CBN of a thickness of 25 μm and a ring of sintered alloy surrounding the circumference of the head layer and the supporting layer.

The composite material block was subjected to the electron spark wire cutting method to obtain cylindrical sticks of composite materials of 2 mm in diameter and 19.2 mm in length each of which contains a hot pressed diamond head member of 1.2 mm in length bonded at the top end of the supporting member of WC-12% Co through an interlayer of hot pressed CBN of 25 μm in thickness.

The above composite block was also cut by the electron spark method employing a pipe electrode means to obtain sticks of composite materials of the same configuration as the above mentioned composite sticks.

One of the above composite stick was fitted in a hole of a steel shank and brazed thereto. The outer surface of the stick was then finished worked by grinding to form a punch of a predetermined size.

The obtained punch exhibited a service life time 100 times longer than the steel punch of the prior art in punching paper-bakelite circuit boards

EXAMPLE 3

A composite material block was prepared by conducting a hot press in the same manner as Example 2 except that a cylinder block of WC-1% $Cr_3C_2$20% Co was employed in lieu of that of WC-12% Co and that the mixture of diamond powder was charged in the container so as to obtain a hot pressed layer of 1 mm in thickness.

The thus obtained composite block was subjected to the electron spark wire cutting method to obtain cylindrical composite sticks of 0.3 mm in diameter and 18.5 mm in length, each comprising a supporting member of WC-1% $Cr_3C_2$-20% Co having a mean particle size of 0.7 μm and a head member of hot pressed diamond of 0.5 mm in length bonded to the top end of the supporting member through an interlayer of hot pressed CBN of 25 μm in thickness.

EXAMPLE 4

The following were prepared:

A cylinder block of $(Mo_7, W_3)C$-11% Co sintered alloy of 24 mm in outer diameter and 25 mm in height and having a circular recessed portion of 20 mm in diameter and 3 mm in depth at the upper end thereof:

a circular disc of WC-12% Co sintered alloy of 20 mm in outer diameter and 0.5 mm in thickness; and a mixture of diamond powder containing 80% of diamond powder having a particle size of and the balance being WC-15% Co powder having a particle size smaller than 0.5 μm.

The mixture of diamond powder was charged in the recessed portion and pressed to form a layer of the powder of 2.3 mm in thickness and the recessed portion was closed with the circular disc to form a container. The thus prepared container was charged in a hot press machine and the hot press was conducted at 1400° C., under a pressure of 55 kb and for 15 minutes.

After cooling the container and loosing the pressing pressure, the circur disc was removed by grinding to obtain a composite block composed of a hot pressed diamond layer of 1.5 mm in thickness in that recessed portion and a cylinder block of $(Mo_7, W_3)C$-11% Co.

The composite block was subjected to the electron spark wire cutting method to obtain cylindrical sticks of composite materials of 2 mm in diameter and 23.5 mm in length each of which contains a hot pressed diamond head member of 1.5 mm in length bonded at the top end of the supporting member of $(Mo_7, W_3)C$-11% Co.

The above composite block was also cut by the electron beam cutting method to obtain sticks of composite materials of the same configuration as the above mentioned composite sticks.

EXAMPLE 5

The hot press of the composite material block and the cutting thereof into the cylindrical sticks were conducted in the same manner as Example 4 except that a cylinder block of WC-0.5% VC-13% Co was employed in lieu of that of $(Mo_7,W_3)C$-11% Co.

The obtained cylindrical stick was of 2 mm in diameter and 23.5 mm in length and comprised a supporting member of WC-0.5% VC-13% Co having a mean particle size of 0.7 μm, and a head member of hot pressed diamond of 1.5 mm in length.

EXAMPLE 6

The followings were prepared:

A ring of WC-12% Co sintered alloy of 18 mm in outer diameter, 14 mm in inner diameter and 15 mm in height;

a cylinder block of 96 wt % W-3 wt % Ni-1 wt % Cu alloy of 14 mm in outer diameter and 12 mm in height;

a circular disc of WC-12% Co sintered alloy of 14 mm in outer diameter and 0.5 mm in thickness; and a mixture of CBN powder which was obtained by mixing a powder A containing 85% of CBN having a particle size of 3 μm and the balance of $TiN_{0.82}$ with a powder B of Al at a ratio of A:B of 80:20, heating the mixture in a vacuum furnace for 30 minutes at 1000° C. and grinding the same to 0.3 μm.

The cylinder block of W alloy was inserted in the ring to define therein a hollow space of 14 mm in diameter and 3 mm in depth in which the mixture of CBN powder was then charged and pressed to form a layer of a thickness of 1.7 mm, and the upper portion of the hollow space was closed with the circular disc to form a container. The thus prepared container was charged in a hot press machine and the hot press was conducted at 1250° C., under a pressure of 50 kb and for 20 minutes.

After cooling the container and loosing the pressing pressure, the circur disc was removed by grinding to obtain a composite block composed of a supporting layer of 12 mm in height, a hot pressed CBN layer of 1 mm in thickness bonded to the upper surface of the supporting layer and a ring of sintered alloy surrounding the circumference of the head layer and the supporting layer.

The composite material block was subjected to the electron spark wire cutting method to obtain cylindrical sticks of composite materials of 1 mm in diameter and 13 mm in length each of which contains a hot pressed CBN head member of 1 mm in length bonded at the top end of the supporting member of 96 wt % w-3 wt % Ni-1 wt % Cu alloy.

The above composite block was also cut by the ion beam cutting method to obtain sticks of composite materials of the same configuration as the above mentioned composite sticks.

EXAMPLE 7

The hot press was conducted in the same manner as Example 6 except that a cylinder block of WC-2% TaC-16% Co was employed in lieu of that of W alloy of W-3 wt % Ni-1 wt % Cu to obtain a composite material block comprising a supporting layer of 12 mm in height, a layer of hot pressed CBN of 1 mm in height bonded on the upper surface of the supporting layer, and a ring of the sintered alloy surrounding the supporting layer and the CBN layer.

The thus obtained composite block was subjected to the electron spark wire cutting method to obtain square sticks of 1 mm in sectional side and 13 mm in length.

Each square stick comprised a supporting member of WC-2% TaC-16% Co having a mean particle size of 1 μm and a head member of 1 mm in length of hot pressed CBN bonded to the top end of the supporting member.

The square stick was ground at one end portion of the sintered alloy side for a certain length to a cylindrical form as shown in FIG. 5 (a). Then, the cylindrical end portion was fitted in a hole of a steel shank and brazed thereto The square stick was then finish worked to obtain a square punch of a predetermined size. It was confirmed that the thus obtained square punch has an excellently long service life time as compared with the steel square punch of the prior art in punching the paper-bakelite circuit boards.

EXAMPLE 8

The followings were prepared

A ring of WC-12% Co sintered alloy of 40 mm in outer diameter 36 mm in inner diameter and 40 mm in height;

a cylinder block of WC-12% Co sintered alloy of 36 mm in outer diameter and 34 mm in height;

a circular disc of WC-12% Co sintered alloy of 36 mm in outer diameter and 0.5 mm in thickness; and a mixture of CBN powder containing 60% of CBN powder having a particle size of '3 μm and the balance being TiN-10% wt % Al powder.

The mixture of CBN powder was compacted to a form of a circular disc of 36 mm in diameter and 2.5 mm in thickness.

Inside the ring, a circular disc of sintered alloy, a circular disc of CBN compact, a cylinder block of sintered alloy, another circular disc of CBN compact and another circular disc of sintered alloy were piled in the above mentioned order from the bottom side to thereby form a container. The thus prepared container was charged in a hot press machine and the hot press was conducted at 1200° C., under a pressure of 40 kb and for 20 minutes.

After cooling the container and loosing the pressing pressure, the circur discs of sintered alloy of the upper and lower sides were removed by grinding to obtain a composite block of 36 mm in diameter and composed of a supporting layer of 34 mm in height, two hot pressed CBN layers each being of 1.5 mm in thickness and respectively bonded to the upper and lower surfaces of the supporting layer and a ring of sintered alloy surrounding the circumference of the CBN layers and the supporting layer.

The composite material block was subjected to the electron spark wire cutting method to obtain cylindrical sticks of composite materials of 2.5 mm in diameter and 37 mm in length each of which contains a hot-pressed CBN head member of 1.5 mm in length bonded at the both ends of the supporting member of WC-12% Co.

The above composite block was also cut by the electron beam cutting method to obtain sticks of composite materials of the same configuration as the above mentioned composite sticks.

Each of these sticks was cut into two pieces at the mid position of the axial direction to provide a pair of cylindrical sticks, each being of 2.5 mm in diameter and 18 mm in length and containing a CBN head member of 1.5 mm in length bonded to one end of a supporting member of WC-12% Co.

We claim:

1. A stick of composite materials comprising a hot-pressed super-hard head member and a supporting member, said head member containing higher than 50 vol % of a diamond powder and/or a high pressure boron nitride powder, and said supporting member being bonded at one of its ends with said hot-pressed super-hard head member, said stick of composite materials being characterized in that:

said hot pressed super-hard head member and said supporting member are bonded together during the hot press process of said hot-pressed super-hard head member;

the stick is of an elongated form having a sectional diameter or an equivalent sectional diameter not larger than 3 mm. the length of the hot-pressed super-hard head member is 0.3 to 2.0 mm in the axial direction of the stick; and the supporting member is more than five times longer in its axial direction than the hot-pressed super-hard head member, the supporting member further having an axial length of at least 10 mm. after said stick is hot-pressed.

2. A stick of composite materials as claimed in claim 1, wherein the diamond or high pressure boron nitride powder has a mean particle size not larger than 30 μm.

3. A stick of composite materials as claimed in claim 2, wherein the diamond or high pressure boron nitride powder has a mean particle size not larger than 10 μm.

4. A stick of composite materials as claimed in claim 1, wherein the supporting member is consisted of a hard sintered alloy containing at least one member selected from the group consisting of carbides of Group IVa, Va and VIa elements of the Periodic Table and mutual solid solutions thereof, and a binder material of iron group metal.

5. A stick of composite materials as claimed in claim 4, wherein said hard sintered alloy contains WC as a predominent constituent of which the mean particle size is not larger than 3 μm, and not lower than 7 wt % of an iron group metal.

6. A stick of composite materials as claimed in claim 5, wherein the iron group metal is Co.

7. A stick of composite materials as claimed in claim 4, wherein the carbide in the hard sintered alloy has a particle size not larger than 2 μm and the content of the binder material therein is not lower than 12 wt %.

8. A stick of composite materials as claimed in claim 1, wherein the supporting member is consisted of a heavy alloy containing 80 to 98 wt % of W and the balance being Ni-Fe or Ni-Fe-Cu.

9. A stick of composite materials as claimed in claim 1, wherein said hot-pressed super-hard member is bonded to said supporting member through an interlayer having a thickness not greater than 0.5 mm.

10. A stick of composite materials as claimed in claim 1, wherein the stick of composite materials is of a cylindrical form.

11. A process for preparing a plurality of sticks of composite materials each of said plurality of sticks comprising a hot-pressed super-hard head member containing higher than 50 vol % of a diamond powder and/or a high pressure boron nitride powder, and a supporting member being bonded at one of its ends with said hot-pressed super-hard head member, said process comprising the steps of:

charging a hot press container with two layers of materials by piling them adjacent to each other in the pressing direction, one of said layers being for preparing a hot-pressed super-hard head member and, the other layer being for preparing said supporting member which is to be bonded with the first-mentioned layer during the hot-pressing;

hot-pressing said layers of materials under a high pressure and at a high temperature to sinter the first-mentioned layer, and to bond said supporting member layer to said super-hard head member layer, to thereby provide a composite material block having a hot-pressed super-hard layer and a supporting member layer wherein the thickness of said super-hard layer is not larger than 1/6 of that of the the composite material block, said supporting member layer having a thickness after hot pressing of at least 10 mm;

cutting the composite material block in its axial direction by an electron spark wire cutting method into at least two sticks of composite materials each having a diameter not larger than 3 mm.

12. A process as claimed in claim 11, wherein the diamond powder and/or high pressure boron nitride powder have a mean particle size not larger than 30 μm.

13. A process as claimed in claim 12, wherein the diamond powder and/or high pressure boron nitride powder have a mean particle size not larger than 10 μm.

14. A process as claimed in claim 11, wherein the supporting member is consisted of a hard sintered alloy containing at least one member selected from the group consisting of carbides of Group IVa, Va and VIa elements of the Periodic Table and mutual solid solutions thereof, and a binder material of iron group metal.

15. A process as claimed in claim 14, wherein said hard sintered alloy contains WC as a predominent constituent of which mean particle size is not larger than 3 μm, and not lower than 7 wt % of an iron group metal.

16. A process as claimed in claim 15, wherein the iron group metal is Co.

17. A process as claimed in claim 15, wherein the carbide in the hard sintered alloy has a particle size not larger than 2 μm and the content of the binder material therein is not lower than 12 wt %.

18. A process as claimed in claim 11, wherein the supporting member is consisted of a heavy alloy containing 80 to 98 wt % of W and the balance being Ni-Fe or Ni-Fe-Cu.

19. A process as claimed in claim 11, further comprising a step of interposing an interlayer between said layers of materials, whereby said two layers are hot pressed and bonded through the interlayer having a thickness lower than 0.5 mm.

20. A process as claimed in claim 11, wherein the composite material block is cut in its axial direction by means of the electron spark method employing an electrode of hollow cylindrical form.

21. A microdrill device, one end of which is adapted to be received in an opening in a drill shank comprising:

a stick of composite materials, said stick comprising a hot-pressed super-hard head member and a supporting member, said head member containing higher than 50 vol % of a diamond powder and/or a high pressure boron nitride powder, and said supporting member being bonded at one of its ends with said hot-pressed super-hard head member, said stick of composite materials being further characterized in that:

said hot-pressed super-hard head member and said supporting member are bonded together during the hot press process of said hot-pressed super-hard head member;

the stick is of an elongated form having a sectional diameter or an equivalent sectional diameter not larger than 3 mm;

the length of the hot-pressed super-hard head member is between about 0.3 to 2.0 mm in the axial direction of the stick; and the supporting member is more than five times longer in its axial direction than the hot-pressed super-hard head member, the supporting member further having an axial length of at least 10 mm after said stick is hot-pressed.

* * * * *